March 27, 1945.  D. H. CLEWELL  2,372,252
PIVOT FOR GRAVITY METERS
Original Filed July 12, 1940   2 Sheets-Sheet 1
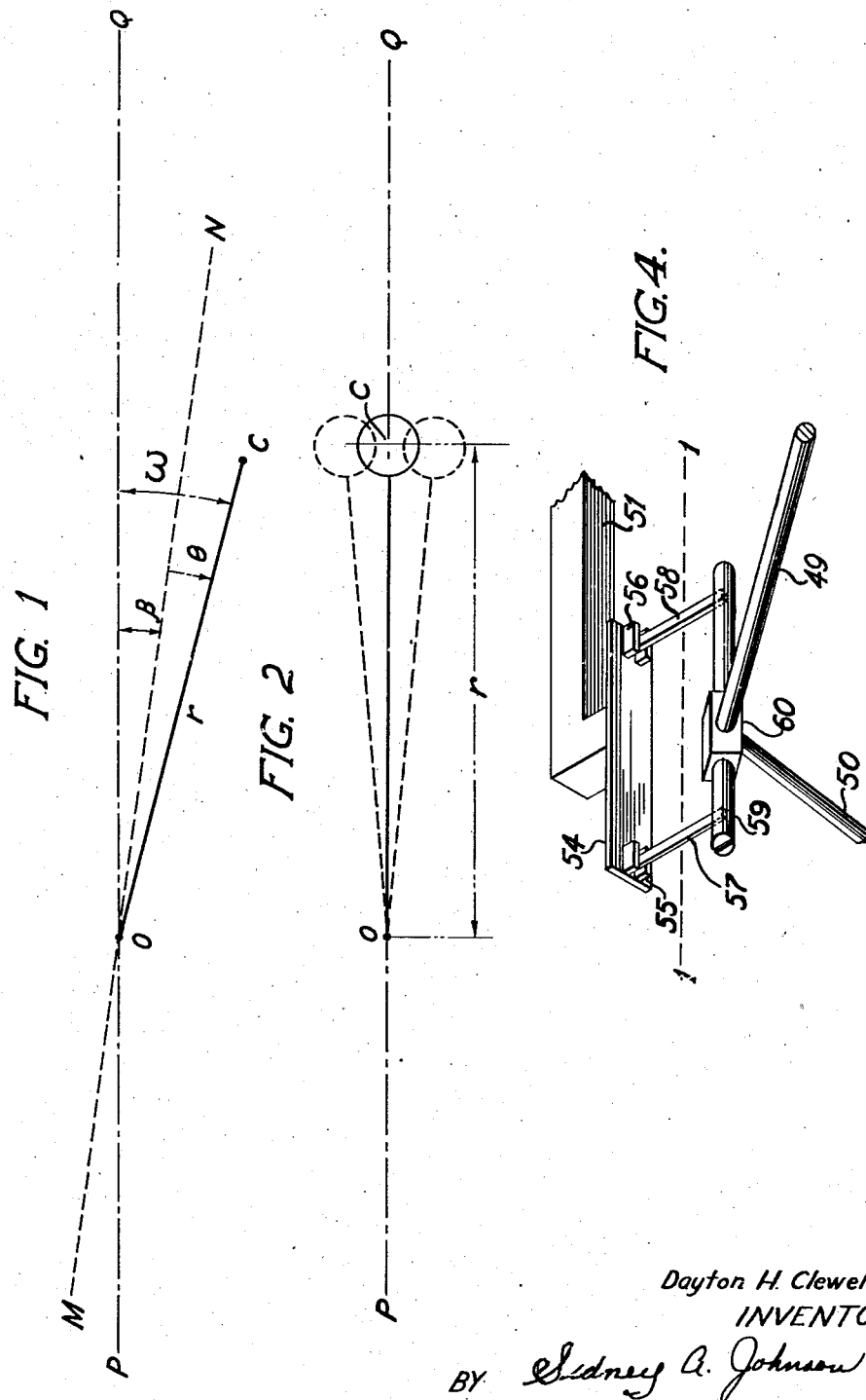
Dayton H. Clewell
INVENTOR
BY Sidney A. Johnson
ATTORNEY

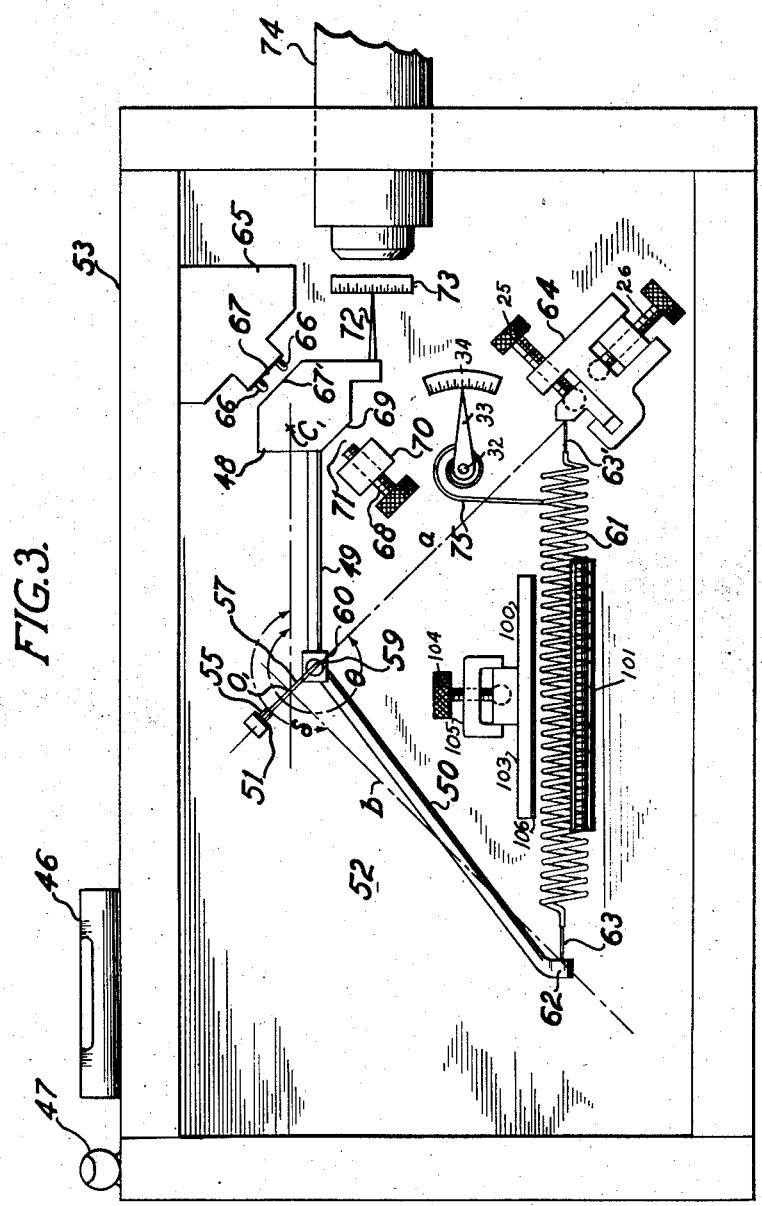

Patented Mar. 27, 1945

2,372,252

UNITED STATES PATENT OFFICE 2,372,252

PIVOT FOR GRAVITY METERS

Dayton H. Clewell, Dallas, Tex., assignor, by mesne assignments, to Socony-Vacuum Oil Company, Incorporated, New York, N. Y., a corporation of New York Original application July 12, 1940, Serial No. 345,097. Divided and this application August 14, 1943, Serial No. 498,681

3 Claims. (Cl. 73—382)

This invention relates generally to geophysical instruments of the type used in locating abnormalities such as discontinuities that are occasioned by faults, anticlines and other structures such as salt domes. More particularly, this invention relates to a method and apparatus for measuring directly variations in gravitational force from point to point over the earth's surface.

This application is a division of my copending application Serial Number 345,097, filed July 12, 1940, now Patent Number 2,337,152.

It has long been known to geologists and others skilled in the art of geophysical prospecting that variations in gravitational force from point to point over the earth's surface are directly related to the disposition of the substrata with respect to the earth's surface; therefore, by measuring the variations in gravitational force from point to point over an area of the earth's surface and plotting these data on maps in the form of contours, a map is formed which simulates the contours of the subsurface strata. Such instruments have been found to be quite reliable and they are being used in the industry successfully in conducting the reconnaissance geophysical surveys.

Experimental work has shown that the pivoted horizontal beam gravity meter, when properly designed and constructed, has many characteristics that make it valuable as a rapid survey instrument. Generally speaking, a pivoted horizontal beam gravity meter refers to any arrangement wherein the center of gravity of any gravity responsive means is free to rotate through a small angular range in a vertical plane about a pivotal axis included in substantially the same horizontal plane as the center of gravity.

In any practical gravity meter it is desirable that the position of the gravity responsive means relative to the reading scale be insensitive to rather large errors in levelling the instrument.

It is also important that the deflection of the gravity responsive means resulting from a change in the force of gravity be in a direction parallel to the force of gravity, for then the gravity responsive means will be relatively insensitive to other stray forces acting in directions different from the direction of gravity. As a contrasting example, the bifilar pendulum can easily be fifty times more sensitive to certain horizontal forces than it is to the vertical force of gravity which is to be measured. Stray horizontal forces may arise from such things as the earth's magnetic field or from slight adhesion between the gravity responsive means and its clamping mechanism.

The horizontal pivoted beam gravity meter, when properly constructed, inherently circumvents troubles arising both from level sensitivity and from abnormally higher sensitivity to certain stray forces than to the force of gravity.

The designer of a novel and useful horizontal beam type of gravity meter must, therefore, provide elastic means for supporting the beam in equilibrium with the force of gravity. This elastic means must be free of elastic afterworking and hysteresis effects and in no way stressed beyond the point where its desirable elastic properties deteriorate. It is also required that this elastic means must support the beam in such a manner that very small changes in gravity will produce deflections of the beam of such magnitude that they are readily observable by means of a conventional optical system, such as a microscope, or other means for determining the position of the beam. Additionally, it is desirable to make the beam as stable as possible to insure reliable performance of the instrument in field work.

In United States Patents No. 1,988,527 to Truman and No. 2,108,421 to Thyssen-Bornemisza, forms of gravity meters are disclosed wherein it is intended that the advantages of high gravity sensitivity be obtained in a practical and useful manner. These inventors in their disclosures fail to consider the question of stability to adjustment and low level sensitivity in connection with the use of a single spring and, as a result, do not disclose the underlying principles of the instant invention.

It is a primary object of this invention to provide a novel method and apparatus whereby the variations in gravitational force from point to point throughout an area on the earth's surface can be measured by a mass pivoted to rotate in a vertical plane and supported in equilibrium by elastic means of such form that the desirable properties of low level sensitivity, hight gravity sensitivity and high stability are obtained.

Still another object of this invention resides in the provision of means whereby the gravity responsive means is elastically supported in a simple and compact manner by a single pretensioned coil spring.

Figure 1 is a diagram developing the theory of the horizontal pivoted beam gravity meter;

Figure 2 is a diagram illustrating the minimum level sensitivity of the instrument;

Figure 3 is a side elevation of an arrangement in a horizontal pivoted beam gravity meter; and Figure 4 is a perspective view of a novel pivoting means that is free of friction.

The general theory of the horizontal pivoted beam can be briefly outlined as follows: In Figure 1, a truly level surface is represented by the line PQ, while the line MN making an angle $\beta$ with PQ is a reference line fixed to the framework of the instrument relative to which the gravity responsive beam is rotatable. The axis of rotation is horizontal and intersects the horizontal line PQ at O. The center of gravity of the beam is at C, a distance $r$ from O. The angle between OC and PQ is $\omega$ and the angle between OC and MN is $\theta$.

The gravity moment of the beam is then $$mgr \cos \omega$$

which is balanced in some way by an elastic torque $\tau$ applied to the beam. The elastic torque is a function of $\theta$, rather than $\omega$, since the elastic means used to generate the torque must obviously be anchored to the framework of the instrument and $\theta$ is the angle denoting the orientation of the beam relative to the framework.

For a general discussion no further specification of the details of the origin and application of the elastic torque is necessary. The instant invention, as will be described later, will be concerned with novel arrangements of the elastic means generating the torque $\tau$.

For equilibrium of the pivoted beam to exist the torque must equal the gravity moment, or, I $\qquad \tau = mgr \cos \omega$ From Figure 1 we note that $$\omega = \theta + \beta$$

thus

Ia $\qquad \tau = mgr \cos (\theta + \beta)$

This equation is a relation that describes the angular position $\theta$ of the beam as a function of gravity $g$. Any means used that is indicative of the position of the beam will naturally be attached to the framework of the instrument so that $\theta$ will be the immediately observable parameter.

Conditions to impose on the parameters of the beam to insure a detectable change in $\theta$ will result from a very small change in gravity, are essential for a useful instrument.

The gravity sensitivity S can be defined as the ratio of the beam deflection $d\theta$ to the fractional change in gravity $$\frac{dg}{g}$$

producing the deflection, or,

II $\qquad S = \dfrac{d\theta}{\dfrac{dg}{g}}$ or $d\theta = S \dfrac{dg}{g}$

To evaluate S, Equation I is differentiated considering $\theta$ and $g$ as variable and $\tau$ as a function of $\theta$.

$$\frac{d\tau}{d\theta} \cdot \frac{d\theta}{dg} = \frac{mgr \cos \omega}{g} - mgr \sin \omega \frac{d\theta}{dg}$$

Rearranging the terms of the above equation:

$$d\theta = \frac{mgr \cos \omega}{\dfrac{d\tau}{d\theta} + mgr \sin \omega} \cdot \frac{dg}{g}$$

which when compared to Equation II shows that

III $\qquad S = \dfrac{mgr \cos \omega}{\dfrac{d\tau}{d\theta} + mgr \sin \omega}$ Equation III is very general and is applicable to any pivoted beam using any type of elastic members to support the beam. Various forms of the torque function result from the variety of available types of elastic members and methods of attachment to the beam.

For practical purposes it is necessary that a gravity meter have sufficient sensitivity S to measurably respond to gravity changes so small that $$\frac{dg}{g}$$

is of the order of $10^{-7}$. To obtain this condition, S is usually of the order of 20 to 200 if high resolving power optical means are used to detect the deflections of the beam. These high values of S are readily obtained by proper selection of the parameters in Equation III. In fact, it is possible to cause the beam to be infinitely sensitive to gravity by choosing the parameters of Equation III in such a manner that the denominator becomes zero; i. e., IV $\qquad \dfrac{d\tau}{d\theta} = -mgr \sin \omega$ Infinite sensitivity is of course impractical so that in any usable instrument S is large, but not infinite. This process of securing high sensitivity by approaching the condition described by Equation IV has been described in various ways in the prior art; "labilizing," "astatization" and inducing a "long period of oscillation" are common terms that have been used.

By a further consideration of Equation I it is possible to learn how the parameters of the beam such as $\tau$, $\omega$, $r$, etc., may be chosen to minimize level sensitivity. In Figure 1 it is evident that the angle $\beta$ represents the orientation of the instrument with the true horizontal surface. Errors in levelling will appear as variations in $\beta$. Level errors in the perpendicular direction will appear as variations of the angle which the axis of rotation of the beam makes with the horizontal. This angle will be denoted as $\beta'$. In the development of all the previous equations it has been assumed that the axis of rotation was horizontal and $\beta'$ was equal to zero. To discuss level sensitivity it will be necessary to first assume the axis of rotation is slightly out of level by an amount $\beta'$ and then to determine what effect variations in $\beta'$, as well as in $\beta$, will have on the deflection of the beam.

When $\beta'$ is different from zero, Equation Ia must be modified to allow for a decrease in the gravity moment of the beam when its plane of rotation is not exactly vertical. Equation Ia becomes Ib $\qquad \tau = mgr \cos (\theta + \beta) \cos \beta'$ For minimum level sensitivity it is then required that $$\frac{d\theta}{d\beta} \text{ and } \frac{d\theta}{d\beta'}$$

approach a minimum value, zero if possible, thereby indicating that level errors $d\beta$ and $d\beta'$ will cause a negligible beam deflection $d$.

Differentiating Equation Ib, considering $\theta$ as a function of $$\frac{d\theta}{d\beta} = -\frac{mgr \sin \omega \cos \beta'}{\dfrac{d\tau}{d\theta} + mgr \sin \omega \cos \beta'}$$

Since $\beta'$ is a very small angle, $\cos \beta'$ can be approximated by unity, and by introducing the sensitivity, S, the above equation becomes $$\text{V} \qquad \frac{d\theta}{d\beta} = -S \tan \omega$$

Considering $\theta$ as a function of $\beta'$ and again differentiating Ib $$\text{VI} \qquad \frac{d\theta}{d\beta'} = -S \sin \beta'$$

Thus minimum level sensitivity is acquired by operating the beam in such a position that $\omega$ is essentially zero degrees and by maintaining the axis of rotation in a horizontal plane, so that $\beta'$ is essentially zero, whereupon both $$\frac{d\theta}{d\beta} \text{ and } \frac{d\theta}{d\beta'}$$

closely approach zero. This is readily accomplished by adjusting the center of gravity of the beam into the same horizontal line PQ as includes the axis O. A level vial mounted on the framework of the instrument parallel to the beam is commonly used as an indicator of the correct level position, to assure that $\omega=0$. A second level vial, perpendicular to the first mentioned vial, is commonly used to indicate the level disposition of the axis of rotation.

A further illustration of the method of securing a minimum level sensitivity is shown in Figure 2 wherein it is obvious that so long as the beam is operating within a small angular range above and below the horizontal line PQ, the projection of $r$ (the moment arm of the mass) on the horizontal plane is relatively independent of the angular position of the beam.

It is immediately evident that the condition for low level sensitivity wherein $\omega$ is essentially zero, reduces the sensitivity equation, Equation III to $$\text{IIIa} \qquad S = \frac{mgr}{\frac{d\tau}{d\theta}}$$

To attain a high sensitivity to gravity, it is now only necessary that $$\frac{d\tau}{d\theta}$$

be small compared to $mgr$.

It is obvious that with a large value of the sensitivity S, an appreciable gravity change will deflect the beam to such an extent that the center of gravity of the beam will depart appreciably from the horizontal line PQ, and the level sensitivity will no longer have the desired minimum. Therefore, a preferable embodiment of any horizontal beam gravity meter will include a nulling means by which the beam can always be returned to its horizontal position. The small effort exerted by the nulling means, in order to restore the beam to its preferred horizontal position, will then be a measure of the change in gravity which caused the original deflection of the beam.

Equation IV describes a relationship between the parameters of the beam which, if satisfied, results in an infinitely sensitive beam; i. e., a very unstable beam. Since $\omega = \theta + \beta$ it is entirely possible that some value of $\theta$, within the narrow operating range of the beam, may satisfy the conditions of Equation IV and the beam is unstable at a certain point which may be very close to its preferred horizontal position where $\omega=0$. Such a condition of instability is highly undesirable in a practical field gravity meter. Thus in the construction of a rugged usable gravity meter of this type, the parameters of the beam must be still further restricted to such an extent that a high beam sensitivity can be obtained, while at the same time any unstable position of the beam is as far removed as possible from the operating range of the beam.

This stability restriction can be readily satisfied by requiring the sensitivity, S, to be as constant as possible over the operating range of the beam, i. e., $$\gamma = \frac{dS}{d\theta} \rightarrow 0$$

It is obvious that if S is a finite constant value for all operating positions of the beam, then there will be no positions of infinite sensitivity where the beam is highly unstable. The more closely $\gamma$ approaches zero, the further any points of instability will be removed from the normal operating range and the more stable the equilibrium of the beam becomes.

The new parameter $\gamma$ can be evaluated directly from Equation III considering S and $\theta$ as the variables.

$$\gamma = \frac{dS}{d\theta} = -S \tan \omega - S^2 \left[ 1 + \frac{1}{mgr \cos \omega} \cdot \frac{d^2\tau}{d\theta^2} \right]$$

In any practical instrument the conditions of minimum level sensitivity, $\omega=0$, renders the first term on the right hand side of the equation zero and $$\text{VII} \qquad \gamma = -S^2 \left[ 1 + \frac{1}{mgr} \cdot \frac{d^2\tau}{d\theta^2} \right]$$

From this equation it is apparent that $\gamma$ will approach zero as $$\frac{d^2\tau}{d\theta^2}$$

approaches $(-mgr)$.

From the preceding theoretical discussion it is required that the method of attachment provide that the torque exerted by the elastic member be such a function of the angular rotation of the gravity responsive beam that $\tau$ equals $mgr$ (Equation I with $\omega=0$), so as to fully support the beam in horizontal equilibrium, that $$\frac{d\tau}{d\theta}$$

be a small quantity compared to $mgr$ (Equation IIIa) so as to provide a high sensitivity S, and further that $$\frac{d^2\tau}{d\theta^2}$$

approach $(-mgr)$ (Equation VII), to insure high stability; that is, a low value of $\gamma$. Two obviously simple torque functions satisfying these three conditions are $$\text{VIII} \qquad \tau = Z \sin (\theta - \delta)$$

with $(\theta - \delta)$ in the neighborhood of 90° and Z is a constant closely approximating $mgr$ (exactly equal to $mgr$ when $(\theta - \delta)$ equals 90°), or $$\text{IX} \qquad \tau = Z \cos (\theta - \delta)$$

with $(\theta - \delta)$ in the neighborhood of zero degrees and again Z is a constant closely approximating $mgr$ (exactly equal to $mgr$ when $(\theta - \delta)$ equals 0°). $\delta$ is any arbitrary constant. The designer will also provide a means of adjusting the operating range of the beam within limits that are free of undue level sensitivity; that is, a null means must be provided for maintaining $\omega$ equal to zero. The necessary adjustment of the nulling means required to zero $\omega$ will thus be a measure of the changes in gravitational force.

While the above theory has been discussed in connection with Figures 1 and 2, Figures 3 and 4 are presented in order to illustrate a gravimeter construction for utilizing the theory in operation.

Referring to Figure 3 of the drawings there is shown a form of gravity meter having a mass structure which comprises the main portion 48 and the arms 49 and 50. The mass structure is so designed that its center of gravity will be at the point $C_1$ and will lie in a horizontal plane passing through the axis $O_1$ of the pivot structure for the mass. The mass structure is pivotally secured to the arm 51 carried by the side 52 of the gravity meter housing 53.

The pivot structure for the mass, shown in detail in Figure 4, comprises a leaf spring 54 which is secured at its mid-point to the arm 51. The outer ends of the leaf spring 54 carry clamps 55 and 56, adapted to receive the ends of light ribbon 57 and 58, respectively. The opposite ends of the light ribbon springs 57 and 58 are clamped to the opposite ends of a rod 59. The mass structure, being provided with a clamp 60 at the junction of arms 49 and 50, is rigidly secured to the rod 59 in such a manner that rotation of the mass in a vertical plane flexes the light ribbon springs 57 and 58. The effective axis $O_1$ about which the mass structure rotates is defined by a line 1—1, joining symmetrical points on the two ribbon springs 57 and 58. These two symmetrical points on the light ribbon springs 57 and 58 may or may not be their mid-points. The leaf spring 54 has for its purpose the protection of the small springs 57 and 58 from unduly large tension stresses that might occur when the mass is clamped. It is evident from Figure 4 that the ends of the spring 54 will yield when large tension stress exists in the light springs 57 and 58.

The force of gravity acting upon the mass is balanced elastically by means of a pretensioned spring 61. Since arm 50 in this form of the instrument extends downwardly at an acute angle to a prolongation of the horizontal arm 49 of the structure, the disposition of the pretensioned spring 61 in this case of necessity must be below the horizontal plane passing through the pivotal axis and center of gravity $C_1$ of the mass structure. End 62 of arm 50 is provided with a clamp by means of which end 63 of the pretensioned spring 61 can be secured to the arm 50. The opposite end 63' of spring 61 is adjustably secured by means of an anchor assembly 64 to the side 52 of the gravity meter housing. Assembly 64, through the agency of screws 25 and 26, permits adjustment of the end 63' of the pretensioned spring 61 to any point within a limited vertical plane so as to obtain proper adjustment of the spring. Assembly 64 is also used for adjusting the gravity sensitivity of the mass structure as well as for bringing the mass into the normal operating range and in some instances may be used for nulling the instrument. The manner of operation of assembly 64 is set forth in detail in my Patent No. 2,337,152 of which this application is a division.

The delicateness of the suspension elements for the mass structure require that some means be provided whereby the mass structure can be rigidly clamped when the instrument is being transported from one location to another. To this end is provided a clamp consisting of a stop 65, rigidly secured to a side of the gravity meter housing 53. Stop 65 presents a plane surface 67, having a plurality of fingers 66 projecting from its surface adapted to contact the similar parallel plane surface 67', formed on the major portion 48 of the mass structure. In order to bring the major portion 48 of the mass structure into contact with the fingers 66, there is provided in the form of a screw 68 means adapted to contact a plane surface 69 formed on the side of the mass portion 48, which is opposite from, but parallel to, the plane surface 67'. Screw 68 threadedly engages a support 70 that extends to and is secured to the side 52 of the gravity meter housing. Screw 68 can be rotated to bring its point 71 into contact with the plane surface 69, where further movement of the screw 68 will force the major portion 48 of the mass structure until the plane surface 67' contacts the fingers 66. In this manner the mass structure is rigidly held so that jars, such as are occasioned in transporting the instrument from one location to another, will not injure the instrument.

Because of the considerable mass that will be associated with the spring 61 a clamping means, generally designated by the numeral 100, is provided for rigidly clamping the spring when the mass structure is clamped for purposes of transportation. The clamping means comprise a trough 101, carried by a support (not shown) which is mounted to the side 52 of the gravimeter housing, said trough being adapted to receive the spring 61 when a bar shaped element 103 is pressed against the spring through the agency of the screw 104. Screw 104 is threaded into the support 105 which is also mounted to the side 52 of the gravity meter housing. Preferably the bar 103 carries a layer of soft material, such as leather 106 on its face adjacent the spring. By operation of the screw 104 the bar 103 may be caused to gently press the spring into the trough 101 thereby protecting the spring from injury from shocks given the instrument during transportation thereof.

It is to be understood that although screws have been shown for both clamping mechanisms, they are merely for purpose of illustration and in actual construction of the instrument can be replaced by other means more conventionally adapted to the clamping operation.

In order to observe the displacement of the mass, due to the variations in the gravitational force, any conventional optical system may be used. For purpose of illustration there is shown secured to the major portion 48 of the mass, an indicator 72 that is adapted to cooperate with an adjustable scale 73 to give a reading of the amount of displacement of the mass. Due to the minuteness of this displacement it is necessary that a microscope 74 be used to observe this displacement.

Scale 73, similar to that described in connection with Figure 3, is so calibrated that when the position of the mass is such that its center of gravity $C_1$ and the pivotal axis $O_1$ of the mass structure lie in the same horizontal plane, the indicator 72 will point to zero on scale 73. The zero indication on the scale is preferably located near the center of the scale. For convenience other indications can be measured off on the scale in both directions from the zero point. In this form of instrument, however, it is preferable to employ the null system in order to obtain at all times the maximum benefits of low level sensitivity, for as has been proven above, when the center of gravity of the mass structure $C_1$ and the pivotal point $O_1$ lie in the same horizontal plane, the instrument is least sensitive to level. Therefore it is desirable to operate the instrument as near these conditions as possible. To null the instrument after the mass structure has been displaced by a change in gravity there is provided a spiral spring 75 the outer end of which is secured to the pretensioned coil spring 61 at a point near the end 63' thereof. The inner end of the spiral spring is secured to a shaft 32 journaled for rotation in bearings, not shown, carried by side 52 of the gravity meter housing. Rotation of the shaft 32 will cause the spring 75 to move the body portion of the pretensioned spring 61 in a traverse direction to vary the effective lever arm through which it acts on the mass structure. The amount of effort necessary to displace the body of the spring an amount sufficient to return indicator 72 carried by the portion 48 of the mass structure to the zero position on the scale 73 will be a measure of the gravity change produced by the original displacement of the mass structure. There is provided fixed to the shaft 32 and adapted for rotation therewith, an indicator 33 which cooperates with scale 34. Scale 34 can be calibrated directly in terms of gravitational force. It is obvious to those skilled in the art that any other suitable null system may be used.

Level vials 46 and 47 rigidly mounted to the housing 53 are provided in order that the instrument housing may be oriented in a constant position relative to the gravitational field. In particular, level vial 46 enables the operator to place the center of gravity $C_1$ of the mass structure in the same horizontal plane as the pivot axis $O_1$ when the pointer 72 is reading zero on the scale 73. Level vial 47 is for the specific purpose of levelling the pivot axis, $O_1$.

In conducting a geophysical survey by the gravimetric method, a surveyor first lays out the necessary number of suitably distributed stations over the area to be surveyed. One of these stations is then selected as the base station and the force of gravity measured at all the other stations is compared with the gravity at this station. In operation of the instrument in the field, the gravity meter housing, suitably enclosed in a constant temperature oven, is set up on a tripod at the base station where the gravity survey is to be started and levelled by means of the level vials 46 and 47. The mass structure is then unclamped by backing off the screw 68 to permit the mass to swing free of the fingers 66, in order that the mass structure may be in its normal operating range for the particular area to be surveyed, screw 26 is adjusted until the pointer 72 is within the reading range of the scale 73. For the remainder of the survey no further adjustment of screw 26 is made. To bring the mass structure to the exact zero position, the nulling system is used wherein the shaft 32 is rotated until spiral spring 75 exerts sufficient effort on main spring 61 to zero the mass structure. After the mass structure has been zeroed the position of the pointer 33 on the scale 34 is the gravity reading at this first station, commonly called the base station. To compare the force of gravity at other stations within the area with the force of gravity at this base station, the instrument is transported successively to the other stations, the mass structure and pretensioned spring being clamped during the transportation. At each station the mass structure and spring are released from their clamps and shaft 32 is again adjusted until the pointer 72 is at the zero position on scale 73. The position of pointer 33 on the scale 34 is then the gravity reading at this new station.

To show that the particular arrangement described above possesses the desirable characteristics which the underlying theory indicates as desirable, reference is again made to Figure 1 and Figure 3. Let the reference line MN in Figure 1, which has been described as a line fixed to the instrument housing, be represented in Figure 3 by the line $a$ joining the pivot axis, $O_1$, with the end 63' of the pretensioned spring 61. Let the angle between line $a$ and the plane determined by the center of gravity $C_1$, of the mass structure and its axis $O_1$, be denoted as $\theta$. Also let the angle between the line joining the axis $O_1$, with the end of the pretensioned spring secured by the end 62 of the arm 50, and again the plane determined by the center of gravity $C_1$ and the axis, $O_1$ be $\delta$. It is obvious that $\delta$ is a constant depending upon the particular dimensions that were used in building the mass structure. Let the force F exerted by the pretensioned spring 61 be expressed by the equation $$F = k(L - L_0)$$

where L is the length of the spring for which it exerts the force F, and $L_0$ is the length of the spring for which the spring exerts no force; $k$ commonly known as the spring constant, is, by definition, the force necessary to extend the spring a unit length. $L_0$ is commonly called the initial length of the spring. In manufacturing the spring $L_0$ may be controlled in magnitude, relative to the working length L, by the amount of pretension incorporated into the spring. The torque generated by the pretensioned coil spring 61 will now be the force F multiplied by the effective lever arm on which the spring acts. From the geometry of the arrangement in Figure 3 it is obvious that the torque $\tau$ is X
$$\tau = kab\left[1 - \frac{L_0}{\sqrt{Za^2 + b^2 - 2ab \cos(\theta - \delta)}}\right] \sin(\theta - \delta)$$

where $a$ is the distance from the pivot axis $O_1$ to the end 63' of spring 61; $b$ is the distance from the axis $O_1$, to the other end of the spring 61, and the other parameters are as previously described.

A consideration of the above equation shows that the angles $\theta$ and $\delta$ occur always in combination as $(\theta - \delta)$. Therefore, the torque function $\tau$ is independent of the particular values of $\theta$ and $\delta$ so long as $(\theta - \delta)$ is unchanged. For example, in Figure 3, $\theta$ is shown as approximately 315° and $\delta$ as 225°, so that $(\theta - \delta)$ is about 90°. It is apparent that the torque function would be reproduced in form identical with Equation X for any disposition of the spring relative to the mass structure; that is $\theta$ and $\delta$ could range through all values between 0° to 360° and as long as $(\theta - \delta)$ is substantially equal to 90° the arrangement would be equivalent to the example illustrated in Figure 3.

If in Equation X $(\theta - \delta)$ is approximately 90°, and the product $kab$ is approximately equal to $mgr$ and if still further the pretension in the spring is sufficient to render $L_0$ small compared to L, where $$L = \sqrt{a^2 + b^2 - 2ab \cos(\theta - \delta)}$$

then it is true that the torque function $\tau$ will simultaneously satisfy the three necessary conditions which the underlying theory requires in order that the instrument will be a practical and a useful gravity meter for field work, because making these substitutions in Equation X will reduce Equation X to the same form as Equation VIII. The torque function $\tau$ generated by the particular arrangements described will be of such form that 1. $\tau = mgr$ 2. $\dfrac{d\tau}{d\theta} \ll mgr$ 3. $\dfrac{d^2\tau}{d\theta^2} \cong -mgr$ (approximately)

It will of course be understood that when a pivot structure using the light flexual members as shown in Figure 3 is used, the balance equation will be slightly modified in form from that of Equation X. Thus, in such an instrument, the axis of rotation, being defined as a line joining symmetrical points on the two flexual members, will no longer be rigidly fixed as, for example, in an instrument in which a knife edge pivot is used. However, in any practical arrangement employing this type of pivot structure the flexual members will be small compared to the length of the spring and the movement of the axis will contribute small factors to the balance equation. These small factors that arise will have some influence over the conditions for high sensitivity, i. e.

$$\dfrac{d\tau}{d\theta} \ll mgr$$

but there will be no fundamental change in the theory of the operation of the instrument or in the method by which the conditions of high gravity sensitivity and high stability are obtained.

Certain dispositions of the main pretensioned spring relative to the mass structure are preferable in that the stresses which the pivot structure must support can be made relatively small as compared to certain other dispositions. For example, in any arrangement where the spring has a downward component of force applied to the mass structure, the pivot must support not only the weight of the mass but also this downward component of spring force, whereas if the spring is attached to the mass structure in such a way that it has an upward component of force on the mass, the pivot need support only the difference between the weight of the mass and the upward component of the spring force. The latter arrangement or arrangements where the total spring force is entirely horizontal are therefore preferable.

The term "housing" as used in this specification is intended to include any type of closure or framework in or on which the elements are held in fixed relationship to the earth. As will be obvious to those skilled in the art, an instrument as herein described, made of materials known at present, must be contained in a constant temperature housing in order that the spring constant and the several dimensions of the device remain sufficiently constant to enable the instrument to distinguish very small gravity changes. Various changes and alternative arrangements may be made within the scope of the appended claims, in which it is intended to claim all novelty inherent in the invention as broadly as the prior art permits.

I claim:

1. In a gravity meter having a housing, a mass structure disposed within the housing, pivoting means for mounting the mass structure for rotation in a vertical plane, elastic means for balancing the gravity moment of the mass structure, a support for the pivoting means, said pivoting means comprising a relatively heavy leaf spring secured at its mid-point to the support, a pair of light leaf springs disposed in parallel relationship to each other and having an end of each secured to opposite ends of the relatively heavy leaf spring, clamping means carried by the mass structure adapted to receive the free ends of the light leaf springs to effect a frictionless pivot for the mass structure, whereby excessive stresses imparted to the light leaf springs will in part be absorbed by the relatively heavy leaf spring.

2. In a gravity meter having a housing, a mass structure disposed within the housing, pivoting means for mounting the mass structure for rotation in a vertical plane, elastic means for balancing the gravity moment of the mass structure, a support for the pivoting means, said pivoting means comprising a leaf spring secured at its mid-point to the support, elastic means for connecting the ends of the leaf spring to the mass structure, whereby a frictionless pivot is formed that will afford protection for the elastic means against excessive stresses.

3. In a gravity meter having a housing, a mass structure disposed within the housing, pivoting means for mounting the mass structure for rotation in a vertical plane, elastic means for balancing the gravity moment of the mass structure, a support for the pivoting means, said pivoting means comprising resilient means secured at an intermediate point to the support, a pair of leaf springs connected at one end to said resilient means and at the other end to the mass structure, whereby a frictionless pivot is formed that will afford protection for the leaf springs against excessive stresses.

DAYTON H. CLEWELL.